Dec. 4, 1956 P. O. SCHILLING ET AL 2,772,661
CATTLE STANCHION AND LATCH
Filed March 8, 1955

INVENTORS
PAUL O. SCHILLING
ARTHUR G. MAYER
BY
Wheeler, Wheeler & Wheeler
ATTORNEYS

United States Patent Office 2,772,661
Patented Dec. 4, 1956

2,772,661

CATTLE STANCHION AND LATCH

Paul O. Schilling and Arthur G. Mayer, Horicon, Wis., assignors to Gardner Manufacturing Company, Horicon, Wis., a corporation of Wisconsin Application March 8, 1955, Serial No. 492,856

8 Claims. (Cl. 119—147)

This invention relates to a cattle stanchion and latch.

The movable stanchion bar has a guide slidably connecting its swinging upper end with a relatively fixed arm projecting from the other bar of the stanchion and there is a latch mechanism protected in the closed position of the swinging bar both from dirt and from manipulation by the cattle, there being a flexible means for releasing the latch so that an operator can release it without having his hand in the way of the bar, which is sometimes rather violently displaced by the animal.

The particular latch construction in its relation to the stanchion structure is a feature of the invention, the relatively stationary arm above referred to constituting a channel in which the projecting bolt attached to the free arm is guided for movement toward the keeper which urges the bolt to retract its position and restrains it after it has registered with the bolt-receiving socket. The swinging arm of the stanchion is likewise channel-shaped and, above the conventional filler of wood or the like, is provided with a simple bracket having bearings for the bolt and a seat for the bolt spring, the bolt having a laterally projecting finger which extends through a slot in the stanchion bar and carries an operating chain.

Figure 1:
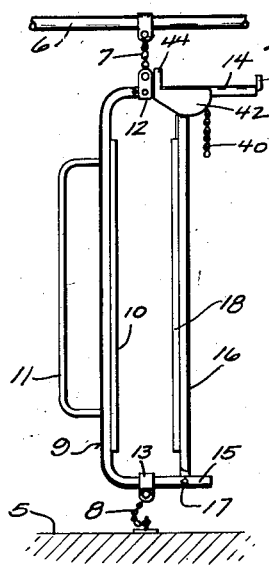
Fig. 1 is a view in front elevation of a stanchion embodying the invention.

In Fig. 1, the floor of the stall is represented at 5 and the forward end of the stall is represented by an overhead bar 6. Flexibly supported between the bar 6 and the floor 5 by means of chains 7 and 8 is the stanchion bar 9 which may be of channel-shaped cross section provided with a wooden insert at 10 in accordance with conventional practice to protect the neck of the cow from direct contact with the stanchion. Also in accordance with conventional practice, an extension may be provided at 11, connected at its ends to the bar 9. The connection of the chains 7 and 8 to the bar 9 may be made by means of clips 12 and 13 which are respectively connected to the horizontal arm portions 14 and 15 at the top and bottom of the stanchion.

Figure 4:
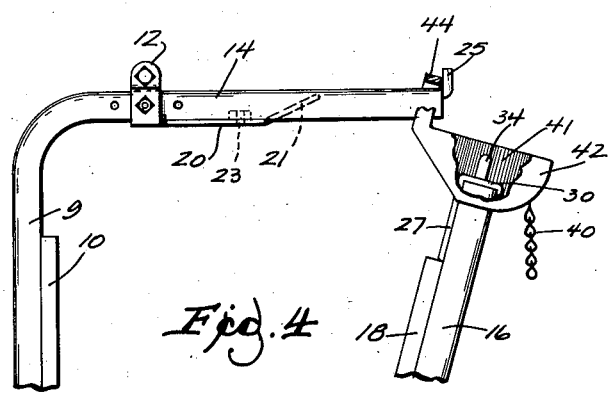
Fig. 4 is an enlarged fragmentary detail view of the parts as they appear in the open position of the stanchion, portions being broken away.

The lower horizontal arm 15 of stanchion bar 9 projects beyond chain 8 and to it the swingable bar 16 of the stanchion is pivoted at 17 to allow bar 16 to swing in a vertical plane from the position of Fig. 1 to the position of Fig. 4. Bar 16 desirably comprises a channel as best appears in Fig. 2. Like bar 9, bar 16 is conventionally provided with a wooden insert at 18 set into the channel to protect the animal from direct contact with the metal of bar 16.

Figure 2:
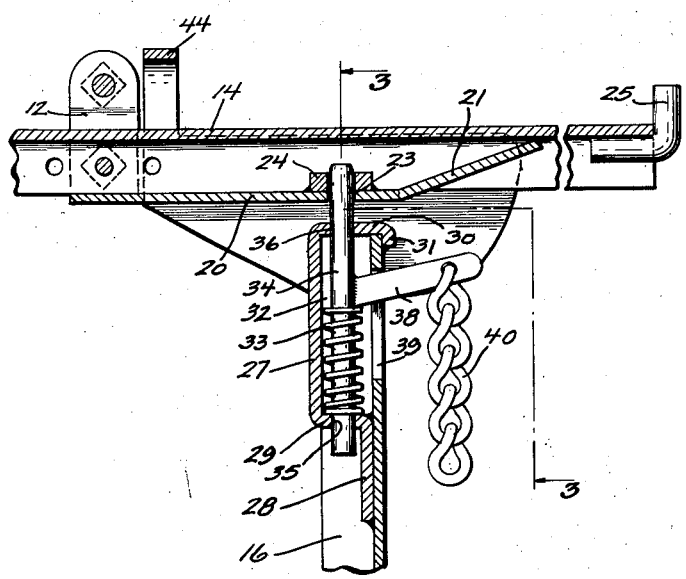
Fig. 2 is an enlarged fragmentary detail view showing the connection between the upper end of the swingable stanchion bar and the arm provided with the keeper, the parts being shown in section.
Figure 3:
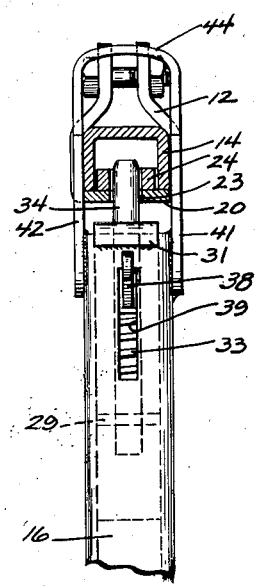
Fig. 3 is a view taken in section on the line 3—3 of Fig. 2.

The clip 12 attached to the upper arm 14 has a keeper strap 20 integrally connected with it to project along the lower side of the channel-shaped arm 14 as best shown in Fig. 2. At its remote end 21, the keeper strap is inclined upwardly into the channel of the arm to act as a cam for facilitating the movement into locked position of the bolt hereinafter to be described. At an intermediate point in the horizontal portion of keeper strap 20, a socket is provided at 23, preferably extended into the reenforcing member 24 applied by welding to the upper side of the strap.

At the end of arm 14 is welded an upwardly turned stop finger 25 for limiting swinging movement of the stanchion bar 16.

The stanchion bar 16 is provided at its upper end with a bracket (27—31) having a portion 28 riveted to the central web portion of the channel-shaped stanchion bar. From portion 28, the bracket extends outwardly at 29 and thence upwardly at 27 to a cap portion 30 which extends across the top of the bar and is downwardly turned at 31. The portion of the bar interior which is enclosed within the bracket shown in Fig. 2 constitutes a spring chamber 32 within which there is a compression spring 33 seating on bracket portion 29 and encircling the bolt 34 for which bearing openings are provided at 35 and 36 in the bracket. At its upper end, the spring 33 seats against the arm 38 which is welded to the bolt and projects laterally through a slot 39 in the stanchion bar 16. Externally of the bar, we provide a flexible operating member 40 which, in practice, comprises a chain, although any flexible operating means would serve. The purpose of making it flexible is to promote safety by enabling the operator to actuate the bolt from the advanced position of Fig. 2 to a stanchion bar-releasing position without requiring the operator to have his hand in the path of outward swinging movement of the stanchion bar.

The upper end of stanchion bar 16, including the bracket, is confined between a pair of guard plates 41 and 42 which embrace opposite sides of the relatively stationary arm 14 and are integrally connected by a strap portion 44 which extends over arm 14 in a position which is considerably elevated above such arm in the closed position of the stanchion bar 16 shown in Fig. 2.

When the operator desires to release the animal from the stanchion, he grasps the flexible operator 40 and pulls downwardly thereon to retract bolt 34 from socket 23. Thereupon the stanchion bar 16 will swing from the position of Fig. 2 to the position of Fig. 4. In this latter position, the strap 44 will engage the stop finger 25 to limit further outward swinging movement of the upper end of bar 16.

To restore the stanchion bar into engagement with the neck of a confined animal, it is only necessary to push inwardly upon the bar. As the bar moves inwardly from the position of Fig. 4, the end of the locking bolt 34 will engage the camming part 21 of the keeper strap 20. This will force the bolt to its retracted position until the bolt registers with socket 23. Upon occurrence of such registration, the spring 33 will force the bolt into the socket thereby locking the stanchion.

In all swinging movements of the stanchion, the plate members 41 and 42 embracing arm 14 will guide the free swinging end of stanchion bar 16 between the extreme positions illustrated. Under no circumstances can the swinging movement of the bar 16 proceed beyond the position shown in Figs. 2 and 4.

We claim:

1. In a stanchion, the combination comprising a first stanchion bar having an arm extending laterally, a movable stanchion bar having an upper end movable laterally relative to said first bar, a retractable locking bolt projecting from an upper end portion of the movable bar, said arm comprising a channel opening downwardly and provided interiorly with a strike plate between the channel sides in the path of the bolt and having one end disposed at an angle to said path to force the bolt to its retracted position in one direction of swinging movement of the last mentioned bar, said strike plate having a socket to which said bolt is guided in the course of its movement and into which said bolt is receivable to lock said last mentioned bar against retrogressive movement.

2. The device of claim 1 in which said strike plate has a portion disposed parallel with and at the level of the margins of the channel sides of said laterally extending arm, said bolt socket being on said parallel portion, the angularly disposed striker plate end being attached to said parallel portion and extending thence substantially to the web of said lateral arm, said striker plate being further provided at the end opposite the angularly disposed portion with integral clamping means adjustably embracing said lateral arm, whereby said striker plate is maintained in an adjustably fixed position longitudinally of said arm.

3. The device of claim 1 in further combination with plate means connected with the said upper end of the movable bar and traversing the laterally extending arm on the first bar to guide the swinging movement of the movable bar and to enclose said bolt.

4. The device of claim 1 in further combination with a plurality of plate means connected with the said upper end of the movable bar and traversing the laterally extending arm on the first bar to guide the swinging movement of the movable bar and to enclose said bolt, a strap connecting the plate means over said arm and said arm having a stop engageable by said strap for limiting the swinging movement of said movable bar.

5. The device of claim 1 in which said bolt has a lateral projection from which a flexible actuator depends for manual retraction of the bolt.

6. In a stanchion, the combination with a movable channel-shaped stanchion bar having inwardly directed flanges and provided between said flanges for a portion of the height of said bar with a non-chafing insert, of a bracket adjacent the top of the bar disposed within the channel between said flanges and comprising upper and lower bearings, and a portion connecting the upper and lower bearings and extending transversely between said flanges, a bolt reciprocable in said bearings, a compression spring disposed between the flanges of the bar and enclosed by said last mentioned bracket portion and encircling the bolt, said bolt having a laterally projecting arm for which a slot is provided in said bar, said arm extending through said slot, the spring seating against said arm and said arm constituting means for retraction of said bolt against spring pressure.

7. The device of claim 6 in which said arm is further provided with a flexible actuator depending from externally of said bar.

8. The device of claim 6 in which said bar is provided with laterally spaced guide plates between which said bolt projects from the uppermost of the said bearings, the bolt being protected from direct accessibility between said plates.

References Cited in the file of this patent
UNITED STATES PATENTS 1,636,072    Quade et al. _____ July 19, 1927
2,544,171    Mitchell _____ Mar. 6, 1951